United States Patent [19]

Mandell

[11] Patent Number: 4,939,911
[45] Date of Patent: * Jul. 10, 1990

[54] VEHICULAR KENNEL FOR PETS

[76] Inventor: Gerald D. Mandell, 1111 Strawberry La., Ashland, Oreg. 97520

[*] Notice: The portion of the term of this patent subsequent to Nov. 7, 2006 has been disclaimed.

[21] Appl. No.: 420,141

[22] Filed: Oct. 11, 1989

[51] Int. Cl.⁵ .............................................. B60H 1/32
[52] U.S. Cl. .................................. 62/239; 62/457.9; 119/15
[58] Field of Search ................ 62/457.1, 457.9, 259.1, 62/323.1, 239; 119/15, 19, 20

[56] References Cited

U.S. PATENT DOCUMENTS

| | | | |
|---|---|---|---|
| Re. 32,113 | 4/1986 | Harr | 119/15 |
| 3,164,971 | 1/1965 | Gentz | 62/241 |
| 3,817,054 | 6/1974 | Adams | 62/243 |
| 3,916,639 | 11/1975 | Atkinson | 62/239 |
| 4,280,330 | 7/1981 | Harris et al. | 62/244 X |
| 4,658,599 | 4/1987 | Kajiwara | 62/239 |
| 4,759,190 | 7/1988 | Trachtenburg et al. | 62/3 |
| 4,878,359 | 11/1989 | Mandell | 62/239 |

*Primary Examiner*—William E. Tapolcai
*Attorney, Agent, or Firm*—Klarquist, Sparkman, Campbell, Leigh & Whinston

[57] ABSTRACT

A portable kennel houses pets that are left in a vehicle on a sunny day. Pets left in vehicles are normally susceptible to heat exhaustion. The disclosed apparatus overcomes this problem without requiring that the vehicle air conditioning system be left on and without jeopardizing the security of the vehicle. One embodiment of the invention comprises a portable enclosure that is sized and adapted to hold a pet, and constructed to prevent unrestricted ingress of air into the enclosure from the outside thereof (such as from the hot passenger compartment of the vehicle in which the kennel may be positioned). The kennel further includes a system for providing cool air to the interior of the enclosure. The system is designed to be operable even when the vehicle engine is turned off and may comprise, for example, one or more Peltier effect devices powered by the vehicle battery or an auxiliary battery.

17 Claims, 2 Drawing Sheets

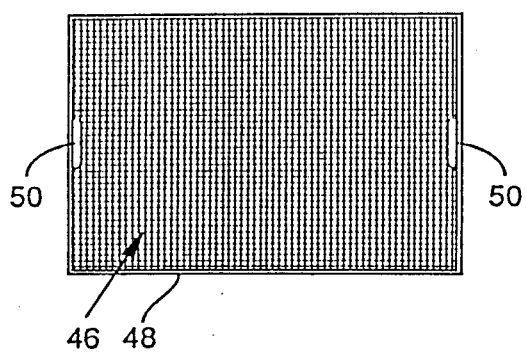
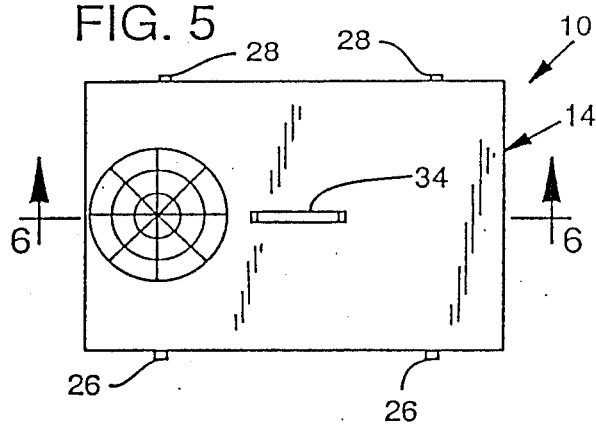
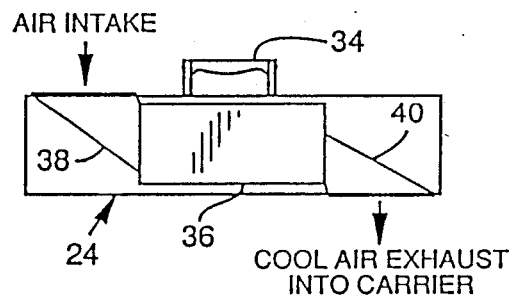
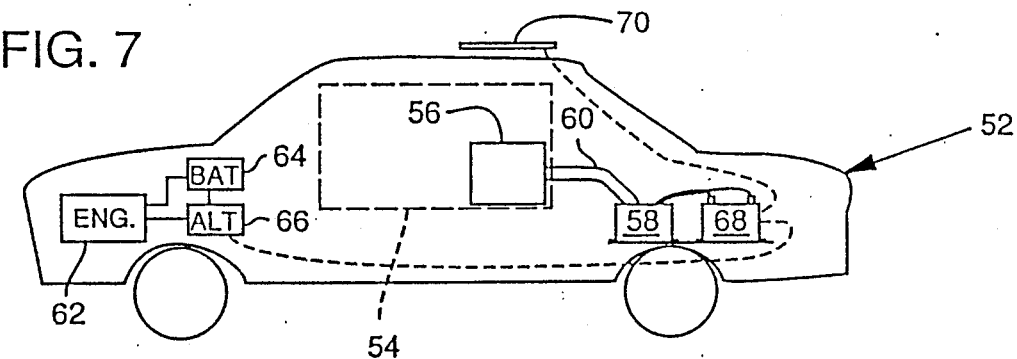
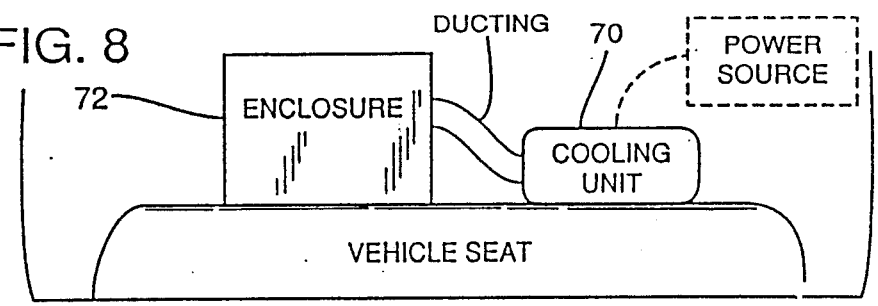

VEHICULAR KENNEL FOR PETS

RELATED APPLICATION

The present application is a continuation-in-part of copending allowed application Ser. No. 7/254,372, the disclosure of which is incorporated by reference.

FIELD OF THE INVENTION

The present invention relates to portable kennels for use with automobiles, recreational vehicles, boats and the like.

BACKGROUND AND SUMMARY OF THE INVENTION

People travelling with pets on sunny days (or hot but overcast days) encounter a problem when they wish to leave their pets in a vehicle, such as a car or recreational vehicle (RV), for more than a few moments at a time. Vehicles quickly heat up to temperatures that are harmful for the pets. The pets may rapidly succumb to heat exhaustion and, unless treated promptly, die a tortured death, their last minutes spent frantically trying to escape their confinement.

The quick heating of vehicle passenger compartments is familiar to anyone who has parked a car in the sun while going shopping or visiting a restaurant. Although some steps may be taken to mitigate the heating effect, these are ineffective in eliminating the risk to pets in the vehicle.

Exemplary of prior art techniques for keeping the vehicle cool are the currently popular sun shades shown in U.S. Pat. No. 4,202,396 to Levy. While these devices may slow the temperature rise in the vehicle, the same temperature is ultimately reached and the pet eventually meets the same fate.

Another proposed solution is to leave the vehicle running with the air conditioning turned on. This approach, of course, has a number of drawbacks. Principal among these is that the car engine overheats. Also, it leaves the vehicle key in the ignition, inviting theft of the vehicle. A further drawback is that a large pet may dislodge the gear shift lever and put the vehicle into gear, risking damage to any property or persons in the vehicle's path.

A somewhat more satisfactory technique is to roll down the vehicle windows to permit cross ventilation. This is the approach urged by organizations, such as the Society for Prevention of Cruelty to Animals, that have been calling attention to this problem for decades. Unfortunately, this technique is not entirely satisfactory either. For example, the interior temperature will always rise to at least that of the surrounding air. That is, an outside temperature of 90° will beget a temperature of 90° plus in the car. If the windows are opened wide, the pet may leave the car and become lost in unfamiliar surroundings. If the windows are opened a smaller distance, the ventilation achieved may not be sufficient to keep the temperature in the vehicle at a tolerable level. Opening the windows any amount jeopardizes the security of the car and its contents.

Although the above-described problem is one of long standing, no fully satisfactory solution has heretofore been found.

Accordingly, it is a principal object of the present invention to provide a satisfactory solution to this problem.

It is a further object of the present invention to provide a solution to this problem without compromising vehicle security.

It is another object of the present invention to provide a solution to this problem without relying on the vehicle air conditioning system.

According to one embodiment of the present invention, a kennel for travelling with a pet is provided comprising a portable enclosure that is sized and adapted to hold the pet. The enclosure is constructed to prevent unrestricted ingress of air into the enclosure from the outside thereof (such as from the hot passenger compartment of a vehicle in which the kennel may be positioned). The kennel further includes a system for providing cool air to the interior of the enclosure. This system is designed to be operable even when the vehicle engine is turned off and may comprise, for example, a solid state cooling device powered by the vehicle battery or an auxiliary battery. In one embodiment, solar cells are employed to recharge a battery power source or, if provided in sufficient number, may be able to power the cooling system without use of a battery. The apparatus also desirably comprises a fan or other means for circulating the cool air and a refresh system for introducing new air into the enclosure so that the oxygen content of the cooled air is not depleted.

The foregoing and additional objects, features and advantages of the present invention will be more readily apparent from the following detailed description thereof, which proceeds with reference to the accompanying drawings.

BRIEF DESCRIPTION OF THE DRAWINGS

FIG. 4 is a section view taken on line 4—4 of FIG. 1 showing the mesh flooring and removable litter tray used in the FIG. 1 embodiment of the present invention.

FIG. 5 is a top plan view of the kennel of FIG. 1.

FIG. 6 is a section view taken on line 6—6 of FIG. 5 showing the air refrigeration system and associated ducting employed in the kennel of FIG. 1.

FIG. 7 is a schematic view showing an embodiment of the present invention in which a power source and cooling system are mounted to the car rather than to the pet enclosure unit.

FIG. 8 is a plan view of still another embodiment of the present invention.

DETAILED DESCRIPTION

Figure 1:
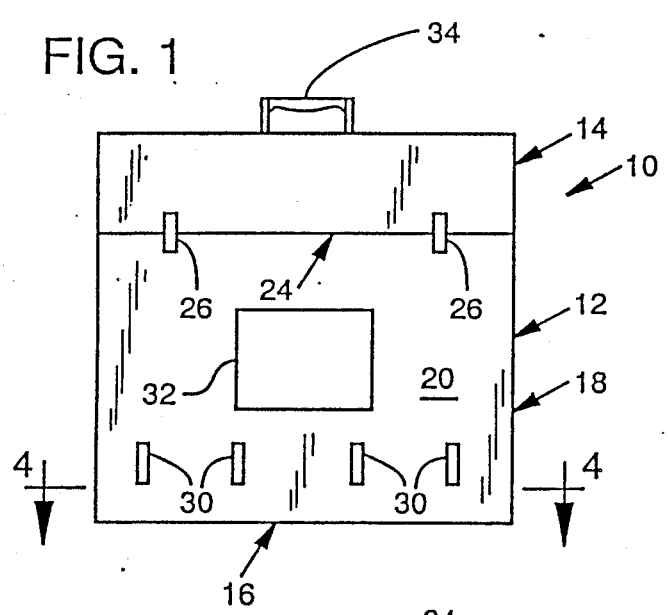
FIG. 1 is a front plan view of a vehicular kennel according to one embodiment of the present invention.
Figure 3:
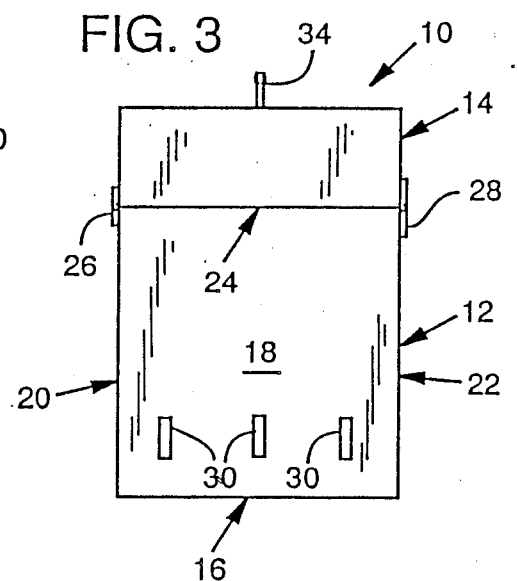
FIG. 3 is a side plan view of the kennel of FIG. 1.
Figure 2:
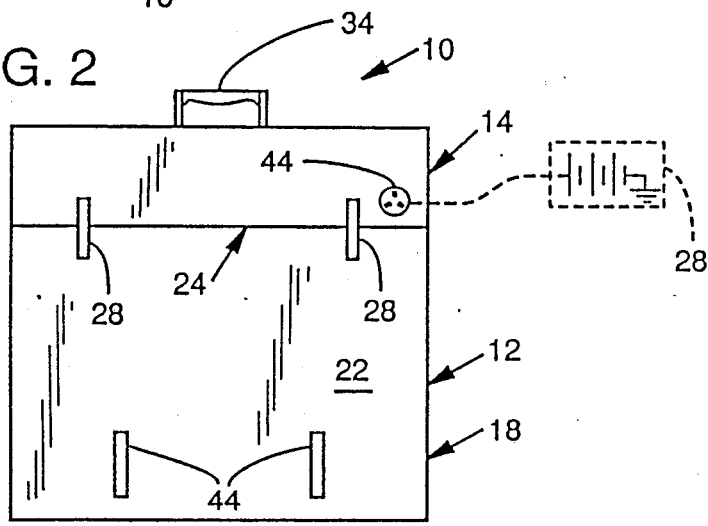
FIG. 2 is a rear plan view of the kennel of FIG. 1.

Referring to FIGS. 1-3, there is shown therein a kennel 10 according to one embodiment of the present invention. The kennel 10 includes an enclosure 12 and a thermostatically controlled cooling unit 14. The enclosure 12 includes bottom, side, front and rear walls 16, 18, 20 and 22 which define a space into which a pet can comfortably be received. The top wall 24 of the enclosure is the bottom wall of the cooling unit 14. The illustrated cooling unit 14 is affixed to the enclosure by clip closures 26 on the front wall 20 and by hinges 28 (with removable pins) on the rear wall 22. (Other fastening means could of course be used.) By such arrangements, the cooling unit serves as the door to the enclosure and can be pivotally swung up from the enclosure to permit the pet to be placed therein. (The cooling unit 14 may also be removed entirely and replaced by a top panel so that the unit may also serve as a conventional animal carrier.)

On the front and side walls 20, 18 of the enclosure 12 are a series of air vents 30 which permit some of the cool air in the enclosure to escape so that the air therein can be replenished by fresh air, as described below. A window 32 can also be provided, if desired. A handle 34 is positioned on the top of the kennel 10 to facilitate its movement. Large units could have multiple handles.

A preferred cooling unit 14 is shown in FIG. 6 and includes a bank 36 of solid state cooling devices that is provided with air to be cooled from an intake duct 38. One type of solid state cooling device useful in the present invention relies, for its cooling properties, on exploitation of the Peltier effect. The Peltier effect is a physical phenomenon in which heat is absorbed at the junction of two dissimilar metals when a current is passed through the junction. Such devices are most commonly used in cooling high power semiconductor components. U.S. Pat. Nos. 3734293, 3347453, 3309565, 3219993, 3207159, 3111813, 3093135, 3077080 and 3077079 illustrate the use of Peltier devices and are incorporated herein by reference.

Air that has been cooled by the cooling unit 14 leaves through output duct 40 and is carried therethrough to the enclosure 12. The cooling unit 14 is powered from a battery 42 connected to a power plug 44 on the rear of the unit (FIG. 2).

In one embodiment, the battery used is the vehicle's own battery. In other embodiments, one or more auxiliary batteries are used so that the charge on the vehicle's primary battery is not depleted. If an auxiliary battery is used, it can be included as part of the kennel itself or can be positioned remotely in the vehicle and connected to the kennel by appropriate cabling, as discussed below in connection with FIG. 7.

For simplicity of illustration, the intake duct of the cooling system 14 is shown in FIG. 6 as drawing air from the outside of the enclosure. In many embodiments, it is preferable to recirculate some of the cool air from within the enclosure by routing the intake duct to the inside of the enclosure. A secondary intake duct can then be used to supplement the recirculated air by drawing a small amount of fresh air from outside the enclosure. A corresponding volume of air is exhausted from the vents 30 on the front and sides of the enclosure. By this arrangement, the pet is saved from suffocation caused by incessant recirculation of the same air, while the cooling operation is optimized by reusing some of the previously cooled air. (It will be recognized that the fresh air intake can be from the passenger compartment of the vehicle or from a location external to the passenger compartment.)

Shown in FIG. 2 is an arrangement that can be used to secure the kennel inside the vehicle. The mounting technique here contemplated comprises a pair of anchors 44 through which a vehicle seat belt can be routed. This arrangement assures that the kennel 10 is securely positioned, yet permits ready removal of the kennel from the vehicle. The anchors 44 can be molded as an integral part of enclosure 12, or may be affixed separately.

FIG. 4 shows the floor 46 on which the pet is carried. The illustrated floor is a rabbit wire mesh with a one-quarter inch grid. Positioned below the mesh floor is a litter tray 48 with a one-inch depth for containing cat litter or newspaper. The tray 48 is provided with handles 50 to facilitate lifting of the tray from the kennel for cleaning.

FIG. 7 schematically shows one embodiment of the present invention which has certain components fixed in the vehicle. Referring to that figure, a vehicle 52 has a passenger compartment 54 in which a pet enclosure 56 is placed. Illustrated pet enclosure 56 differs from enclosure 12 discussed earlier in that enclosure 56 does not include a cooling unit associated therewith. Instead, a cooling unit 58 is mounted in another portion of the vehicle and is coupled to the enclosure by ducting 60.

Vehicle 52 includes an engine 62, a starter battery 64 and an alternator 66. However, the cooling unit 58 is powered from a power source distinct from the starter battery. This other power source 68 can be a second battery, a source of natural gas, etc. If a second battery is used, it can be recharged either from the engine alternator 66 or from an array of photovoltaic cells 70. By this arrangement, the bulk and weight of the enclosure unit 56 is reduced, yet the invention still achieves the above-stated objects.

FIG. 8 shows a related embodiment in which the cooling unit 70 is distinct from the enclosure 72, but both are portable and removable from the vehicle. The cooling unit may be strapped to the seat using a seat belt (as illustrated previously), or it may rest on the floor. It may even by positioned on top of the enclosure 72.

The enclosures 12, 56, 72 described above can, of course, be fabricated of a number of different materials. The illustrated enclosures are formed of molded plastic and are provided with insulation to reduce the load on the cooling systems. (The insulation may, of course, be omitted and the enclosures may be made commensurately smaller.) Of course, the size of the enclosure can be selected to match the requirements of the pet and the vehicle. As an option, the units can be provided with 110 volt AC to 12 volt DC power inverters so that they can be powered from 110 volt AC when removed from a vehicle and used near an electrical outlet, such as a camp site.

Having described and illustrated the principles of my invention with reference to a preferred embodiment and several variations thereof, it will be apparent that the invention can be modified in arrangement and detail without departing from such principles. For example, while the invention has been illustrated with reference to an electrically operated solid state cooling system, a cooling system powered from natural gas could readily be used. In still other embodiments, other cooling technologies, such as compressors or evaporative coolers, could be substituted for the solid state cooling system illustrated.

It will further be recognized that, while the invention has been described with reference to the particular situation in which a vehicle is left unattended with a pet in it, the invention finds other application as well. For example, in certain conditions, the conventional air conditioner provided with a vehicle may not be sufficient to adequately cool the vehicle for a pet, even when the engine is operating at high speeds. This can be the case, for example, in particularly hot climates, such as the deserts of the southwestern United States. While the air conditioner may reduce the temperature in the passenger compartment somewhat, the temperature attained may not be low enough for the pet's prolonged comfort. In these situations, the present invention also finds application, serving to reduce the temperature in the relatively small pet enclosure to a safe temperature for the pet.

Finally, while the invention has been illustrated with reference to a forced air cooling system, alternative cooling mechanisms such as convection and conduction can alternately be employed. For example, in the enclosure 12 of FIG. 1. etc., a liquid refrigerated by cooling unit 14 can be circulated within the walls of the enclosure to thereby cool the pet contained therein.

In view of the wide range of embodiments and uses to which the principles of the present invention can be applied, it should be understood that the apparatuses and methods illustrated are to be considered illustrative only and not as limiting the scope of the invention. Instead, my invention includes all such embodiments as may come within the scope and spirit of the following claims and equivalents thereof.

I claim:

1. A method of travelling with a pet, comprising the steps:
    placing the pet in an enclosure;
    placing the enclosure in the passenger compartment of a vehicle that includes a vehicle battery;
    operating a cooling unit from an electrical energy source independent of said vehicle battery; and
    cooling the enclosure with the cooling unit regardless of whether the vehicle engine is on or off.

2. The method of claim 1 which further includes the step of introducing fresh air into the enclosure to prevent the suffocation of the pet therein.

3. The method of claim 1 in which the cooling step comprises:
    providing an active cooling system; and
    operating the cooling system from a power source not dependent on constant operation of the vehicle engine.

4. The method of claim 3 which further comprises the step of powering the cooling system from a battery.

5. The method of claim 4 which further comprises the step of charging the battery from an alternator connected to the vehicle engine.

6. The method of claim 4 which further comprises the step of charging the battery from photoelectric cells.

7. The method of claim 3 which further comprises the step of powering the cooling system from natural gas.

8. A kennel for use with a vehicle having an engine and a battery, comprising:
    a portable enclosure sized for positioning within a passenger compartment of the vehicle and adapted for holding a pet;
    means for preventing unrestricted ingress of air into the enclosure from the outside thereof;
    electrically operated cooling means for cooling the air inside the enclosure, said means being electrically powered even when the vehicle engine is turned off; and
    means for introducing fresh air into the enclosure to prevent the suffocation of the pet held therein.

9. The kennel of claim 8 which further includes means for powering the cooling means from a second battery distinct from the vehicle battery.

10. The apparatus of claim 9 which further includes means for charging the second battery from the alternator.

11. The kennel of claim 8 in which the cooling means is a solid state cooling device.

12. The kennel of claim 8 which further includes fastening means for removably fastening the enclosure to the vehicle.

13. The kennel of claim 12 in which said fastening means comprising means cooperating with a seat belt in the vehicle for removably securing the enclosure to a set of the vehicle.

14. The kennel of claim 8 which further includes a removable litter tray.

15. The kennel of claim 8 in which the enclosure is adapted to be removed from the vehicle.

16. The kennel of claim 15 in which the cooling apparatus is adapted to be removed from the vehicle with the enclosure.

17. The kennel of claim 8 in which the cooling system is affixed to the vehicle.

* * * * *